United States Patent [19]

Rinehart

[11] 4,408,992
[45] Oct. 11, 1983

[54] TAXIDERMY FISH BODY INSERT PIECE AND METHOD OF MAKING IT

[76] Inventor: John R. Rinehart, 3232 McCormick Dr., Janesville, Wis. 53545

[21] Appl. No.: 381,319

[22] Filed: May 24, 1982

[51] Int. Cl.³ .............................................. G09B 23/36
[52] U.S. Cl. ..................................................... 434/296
[58] Field of Search ......................... 434/295, 296, 297

[56] References Cited

U.S. PATENT DOCUMENTS 1,918,929  7/1933  Pflueger ............................. 434/296

OTHER PUBLICATIONS

*Brief Directions for Taxidermy Procedures and Animal Preparation,* Lucille McCain, Smithsonian Institution, pp. 9-10, Feb. 1960.

*Primary Examiner*—William H. Grieb
*Attorney, Agent, or Firm*—Howard M. Herriot

[57] ABSTRACT

Disclosed is a method of making a taxidermy fish body insert piece. An outline of the fish body is traced on paper, and the outline is reduced marginally a measured amount. A bendable centerboard is made from the reduced outline. Arcuate contour wires are formed on the fish body of actual half-girths at various positions. The wires are traced on a card, and the tracings are reduced the same measured amount. The card is cut on the reduced tracings to produce a contour gauge card having contour cavities into an edge thereof. A fish body insert piece is built up of excelsior wrapped with string, building a half-body upon each side of the centerboard, using the contour gauge card to control the size and shape thereof.

4 Claims, 19 Drawing Figures

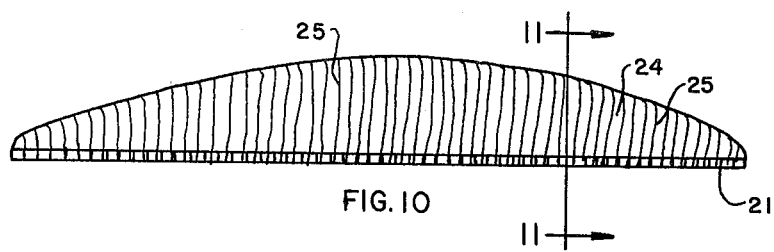
FIG. 10
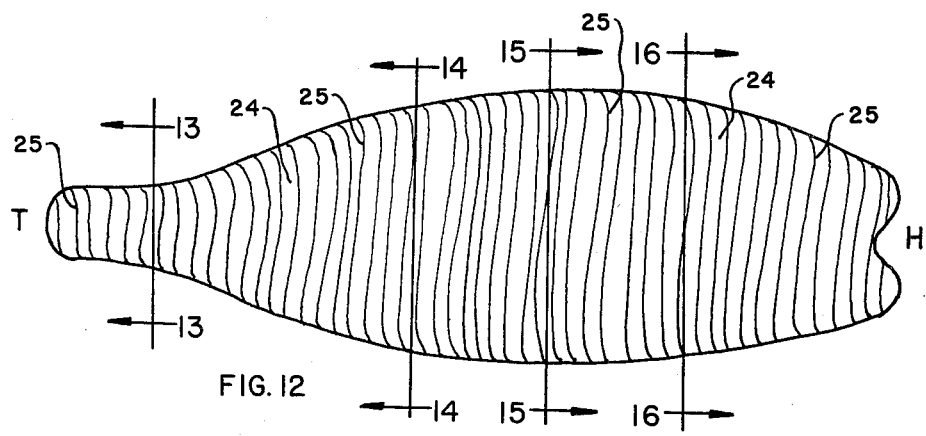
FIG. 12
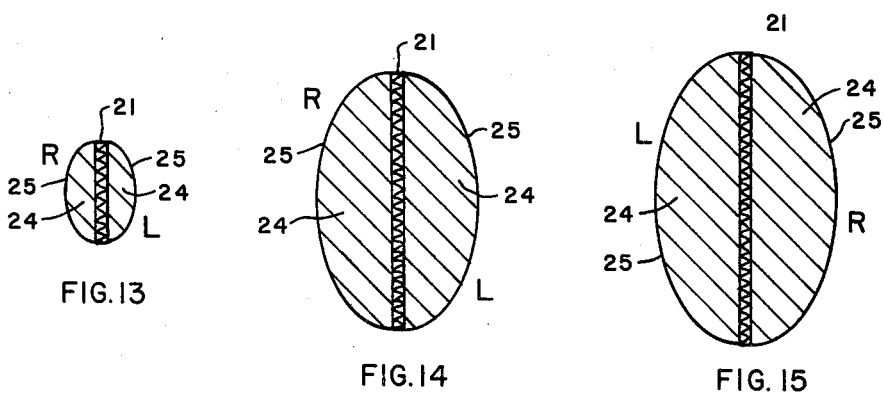
FIG. 13
FIG. 14
FIG. 15
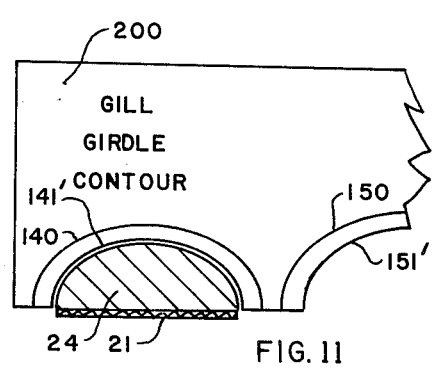
FIG. 11
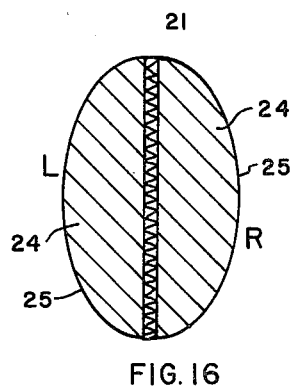
FIG. 16

TAXIDERMY FISH BODY INSERT PIECE AND METHOD OF MAKING IT

BACKGROUND OF THE INVENTION

This invention relates in general to taxidermy fish skin filling, and in particular to a lightweight body insert element used in filling a fish skin.

In taxidermy fish skin filling, to avoid excessively heavy specimens, it is common to use a lightweight body insert element slightly smaller than the fish body itself, which element fills the major and central space of the fish skin cavity to be filled, the remaining annular space about said body insert element being filled with a plastic putty material, so that the insert piece and the putty together substantially duplicate the size and shape of the fish body to give the final desired shape and size to the specimen when the fish skin is sewn together along the back side of the specimen.

It is known to make such a lightweight body insert piece by carving it from a solid block of cellular material such as styrofoam, or by making a cloth sack and filling it with particles of lightweight material. In either case, considerable skill and time is required to produce the insert piece; and particularly so to produce an insert piece curved so as to have the head end and tail end thereof out in front of the midportion thereof, to facilitate an attractive and realistic appearing fish specimen mounted on a wall plaque with the back of the midportion against the plaque and the head and tail of the fish specimen out front from the plaque.

Accordingly, it is an object of my invention to provide a lightweight fish body insert piece which may be easily made to controlled size and shape without requiring special skill or a great deal of time. It is another object of my invention to provide such an easily and quickly made fish body insert piece which can be easily bent into the desired curved shape with the head and tail ends thereof out front from the midportion thereof.

SUMMARY OF THE INVENTION

These and other objects of my invention are provided in a new lightweight fish body insert piece and a method of making it, which includes: tracing on paper an outline of the fish body; reducing that outline marginally a measured amount; making from the reduced outline a bendable centerboard for the fish body insert piece; forming, on the fish, arcuate contour wires of the actual half-girth contours thereof at various positions; tracing on a card said arcuate wires, marginally reducing said tracings the same measured amount and cutting therealong to make a contour gauge card having contour cavities into an edge thereof; and building up, of excelsior wrapped with string, upon each side of the centerboard, one-half of the body insert piece, using said contour gauge card to control the size and shape thereof.

BRIEF DESCRIPTION OF THE DRAWING

The invention will be better understood from the following description presented with reference to the accompanying drawing, in which:

FIG. 10 is a view illustrating the preparation of the fish body insert piece according to my invention;

FIG. 11 is a sectional view taken on lines 11—11 of FIG. 10;

FIG. 12 is a side view of the nearly completed fish body insert piece;

FIG. 13 is a sectional view taken on lines 13—13 of FIG. 12;

FIG. 14 is a sectional view taken on lines 14—14 of FIG. 12;

FIG. 15 is a sectional view taken on lines of 15—15 of FIG. 12;

FIG. 16 is a sectional view taken on lines 16—16 of FIG. 12;

DESCRIPTION OF THE PREFERRED EMBODIMENT

Figure 1:
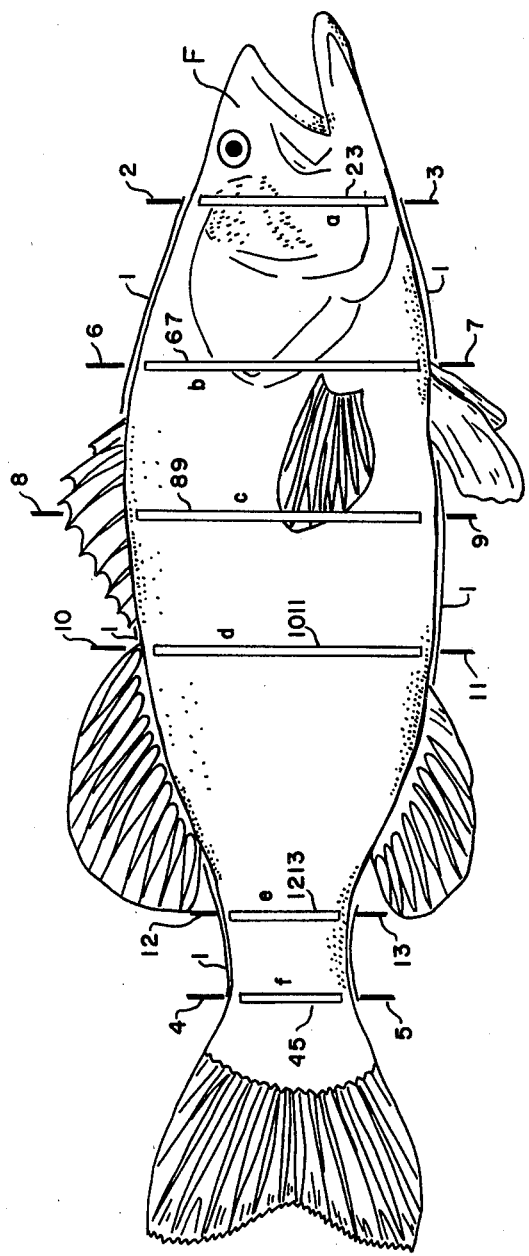
FIG. 1 is a view of a fish laid on paper and of markings made on the paper around the fish, as used in my invention.

Referring now to FIG. 1, a fish F is laid upon a sheet of paper, and an upper and lower outline 1 of the fish body is traced upon the paper sheet along the top and bottom of the fish, exclusive of the head, tail and the fins. A thin straight paper strip 23 is placed on the fish at the forward end of the fish body at the cheek a thereof where the fish body joins the fish head, the strip extends substantially normal to the long axis of the fish. Marks 2 and 3 are made on the paper sheet, respectively, at the top and bottom of the fish at the ends of a line represented by strip 23, to mark the forward ends of the fish body outline tracing. A similar strip 45 is placed on the fish at the rear end f of the fish body extending substantially normal to the long axis of the fish from the upper forward limit of the tail to the lower forward limit of the tail. Marks 4 and 5 are made on the paper sheet, to mark the rearward ends of the fish body outline tracing. Strips 67, 89, 1011, and 1213 are similarly placed on the fish at, respectively, the gill girdle b, the largest girth c, and anal contour girth d, and the tail contour girth e, each strip extending substantially normal to the long axis of the fish and extending substantially across a half-girth of the fish. Marks 6, 7 are made on the paper sheet as shown, as are marks 8, 9 and marks 10, 11 and marks 12, 13 each to respectively mark on the paper sheet points to use in later constructing girth lines across the fish body outline, as explained hereinafter.

Figure 2:
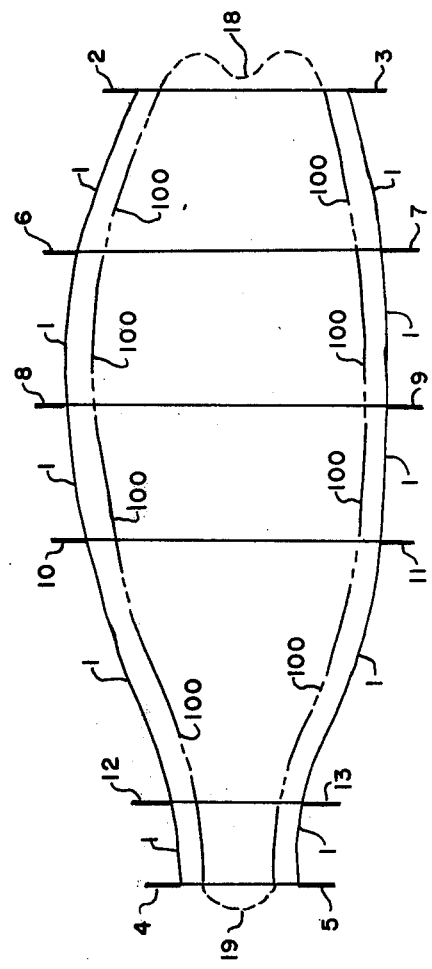
FIG. 2 is a view of the markings shown in FIG. 1, and of other markings added thereto as used in my invention.

FIG. 2 illustrates the paper sheet with the fish removed therefrom, and shows the girth lines and body end lines thereon constructed by joining, respectively, end marks 2, 3, girth marks 6, 7 girth marks 8, 9, girth marks 10, 11, girth marks 12, 13, and end marks 4, 5. FIG. 2 shows outline 1 completed by joining across the gaps left by the fins, and also shows a reduced body outline 100 which is constructed by measuring inwardly from outline 1 a fixed marginal amount such as three-eighths inch along each girth mark and end mark, marking according to said measurement, and connecting said markings with lines 100 parallel to lines 1. Also shown are lines 18 and 19 which respectively define the head end and tail end of the reduced body outline. Line 18 is rounded forwardly slightly at the forward ends of top and bottom lines 100 and has a rearward extending central concavity therein as shown. Line 19 is slightly rounded rearwardly closing the rearward ends of top and bottom lines 100 as shown. The reduced body outline 100, 19, 100, 18 serves as the pattern for forming a centerboard 21 (shown in FIGS. 8 and 9) for the body insert piece, as explained hereinafter.

Figure 3:
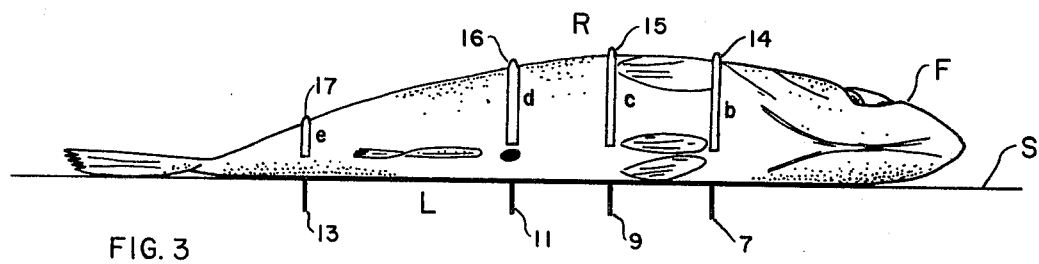
FIG. 3 is a view, from the underside of the fish, showing the bendable contour wires used in my invention.
Figure 4:
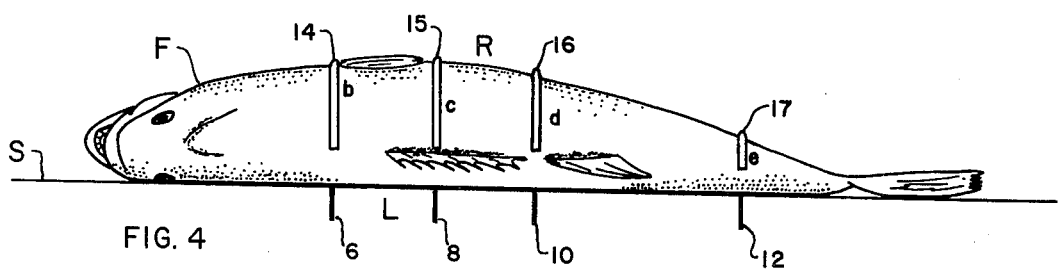
FIG. 4 is a view, similar to FIG. 3, from the upper side of the fish.

FIGS. 3 and 4 show the fish replaced in the same location on the paper, and show the half-girth contour solder wire pieces 14, 15, 16 and 17 which placed on the fish and bent to arcuate shape and cut to length to substantially exactly fit the actual fish half-girths at the respective positions b, c, d and e on the fish, which lies on the surfaces S of the paper on its left side L with its right side R upward.

Figure 6:
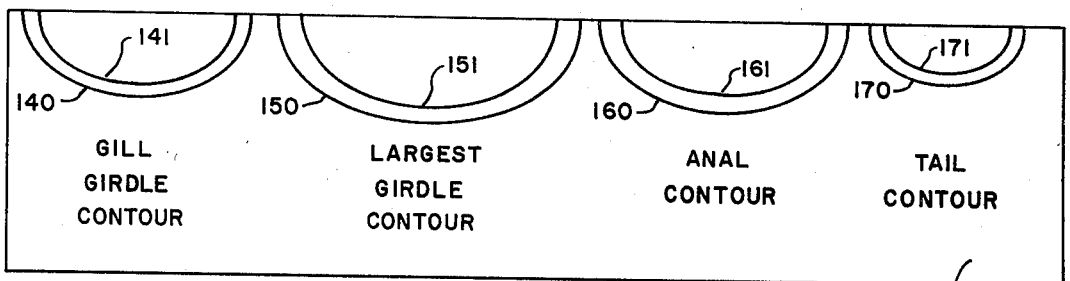
FIG. 6 is a view of a nearly completed contour gauge card.
Figure 7:
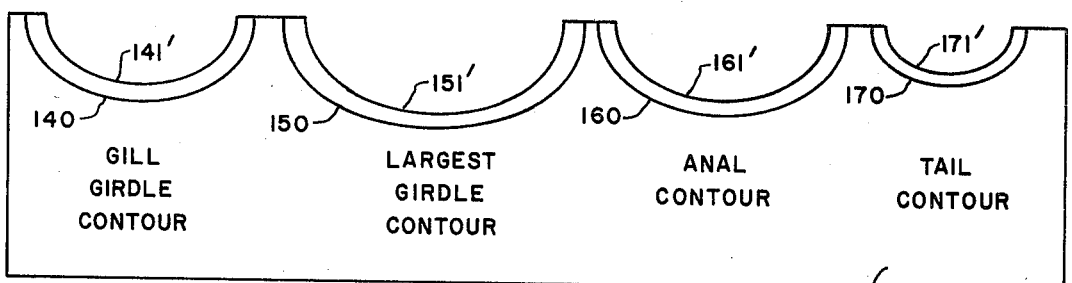
FIG. 7 is a view of a fully completed contour gauge card.
Figure 5:
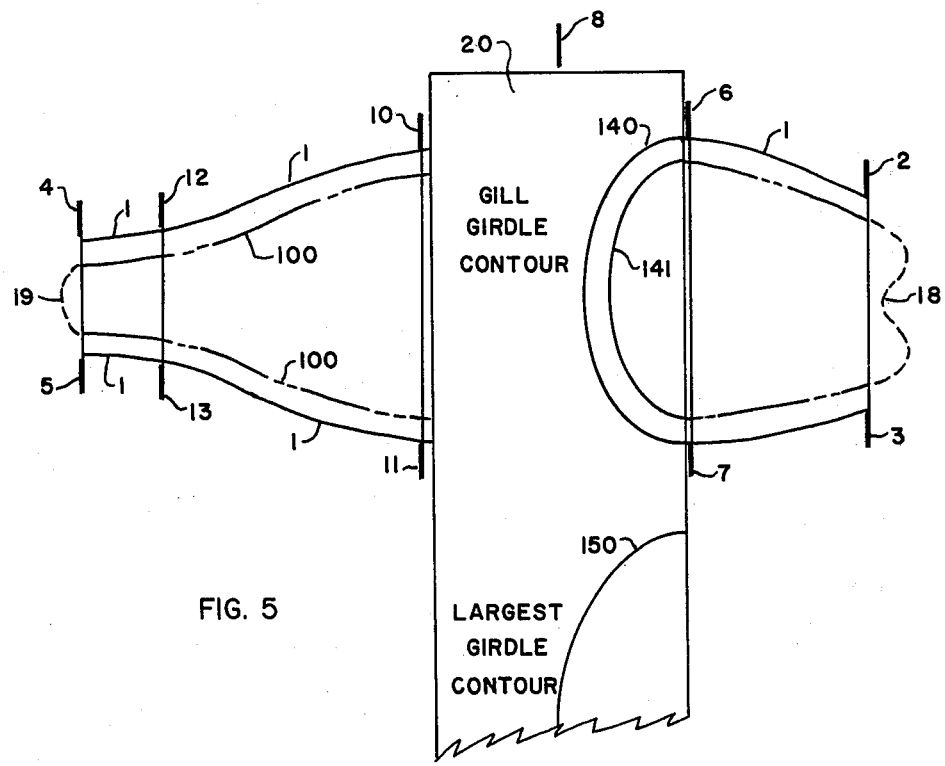
FIG. 5 is a view illustrating the preparation of a contour gauge card according to my invention.

FIGS. 5, 6 and 7 illustrate the making of a contour gauge card 200 from a thin stiff paper chipboard card 20. The completed gauge card 200 is shown in FIG. 7. It is made by tracing the arcuate contour wire pieces 14, 15, 16 and 17 thereon with their ends held at one edge of the card, to mark fish contour lines 140, 150, 160 and 170, respectively; and then constructing reduced fish contour lines 141, 151, 161 and 171 as explained hereinafter, and finally cutting along those reduced fish contour lines to form arcuate gauge cavities 141', 151', 161' and 171' along the edge of the card. FIG. 5 shows card 20 laid upon the paper sheet with fish contour line 140 bridging the fish outline 1 from mark 6 to mark 7 across the gill girdle line. This places the card 20 in proper position for constructing reduced fish contour line 141 thereon by drawing line 141 with its ends at reduced outline 100 on the grill girdle line, and drawing line 141 parallel to line 140. It will be understood that the reduced fish contour lines 151, 161 and 171 are similarly constructed on card 20 by similar alignment, respectively, at the largest girdle line, the anal contour line, and the tail contour line. Then the card 20 is cut on lines 141, 151, 161 and 171 to form the finished card 200 with the arcuate concavities 141', 151', 161' and 171' therein. The names of the contours may be written on the card opposite the pertinent concavities, as shown.

Figure 8:
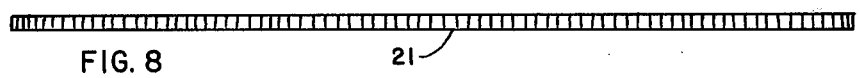
FIG. 8 is a view from an edge of a centerboard used in the fish body insert piece of my invention.
Figure 9:
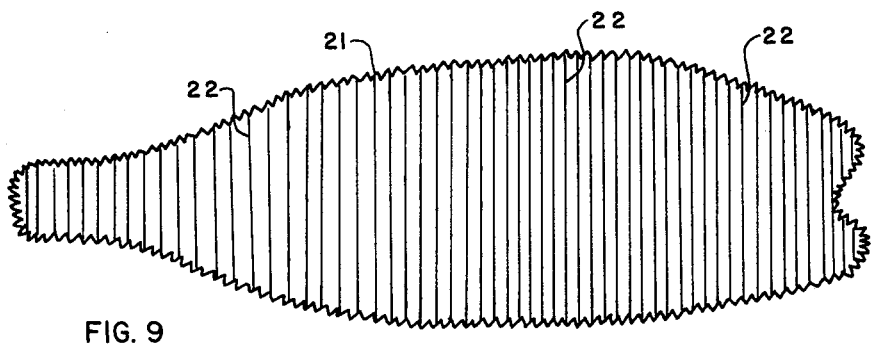
FIG. 9 is a view from a side thereof.

FIGS. 8 and 9 show the centerboard 21 for the fish body insert piece. The centerboard 21 is cut with pinking shears from corrugated fluted cardboard using as a pattern the reduced fish outline 100, 18, 100, 19 shown in FIG. 2, which pattern is transferred to the cardboard taking care to orient the fluting lines 22 of the cardboard to be substantially normal to the long axis of the outline.

FIGS. 10 and 11 show how the fish body insert piece is built up from the centerboard 21 to the desired size and shape. FIG. 10 shows the centerboard 21 having one-half of the fish body insert built up on one side thereof with excelsior 24 wrapped thereto with string 25. FIG. 11 illustrates how the half-girth contours are controlled by checking with gauge card 200 as the excelsior-and-string build-up progresses, showing a section of the build-up at the gill girdle position which is being checked by gauge 200 using concavity 141' to gauge the shape and size of the half-body contour at that position. It will be appreciated that the other concavities 151', 161' and 171' of gauge card 200 are used to gauge the shape and size of the half-body contours, respectively, at the largest girdle position, the anal contour position and the tail contour position. To facilitate usage of the card gauge, the names of those positions are set forth on the card gauge opposite the pertinent concavities for those positions. The same excelsior and string wrap build-up process is followed on the other side of the centerboard 21 to create the other one-half of the fish body insert piece, using the gauge card 200 to check the shape and size as build-up progresses. The shape and size of the fish body insert piece is thereby controlled to the predetermined, measured and established limits to obtain the desired size and shape of the fish body insert piece. FIGS. 12 through 16 show the body insert piece built-up to the desired size and shape.

Figure 17:
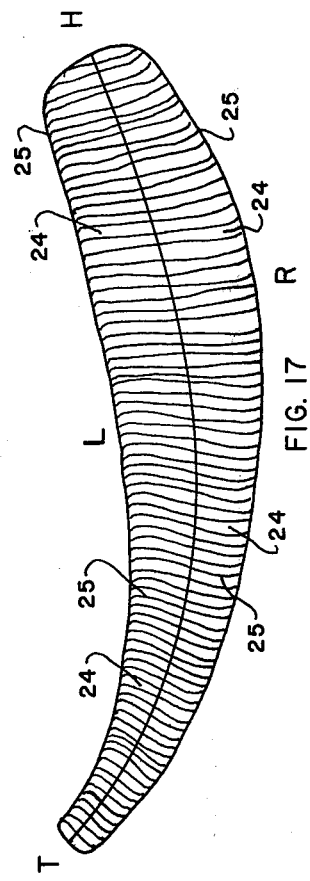
FIG. 17 is a view from the upper side of the fully completed fish body insert piece.

FIG. 17 shows how the body insert piece is bent so that the head end H thereof and the tail end T thereof are out front from the central portion thereof, the right side R thereof being the backside and the left side L thereof being the frontside. The fluting of the cardboard centerboard facilitates this bending.

Figure 18:
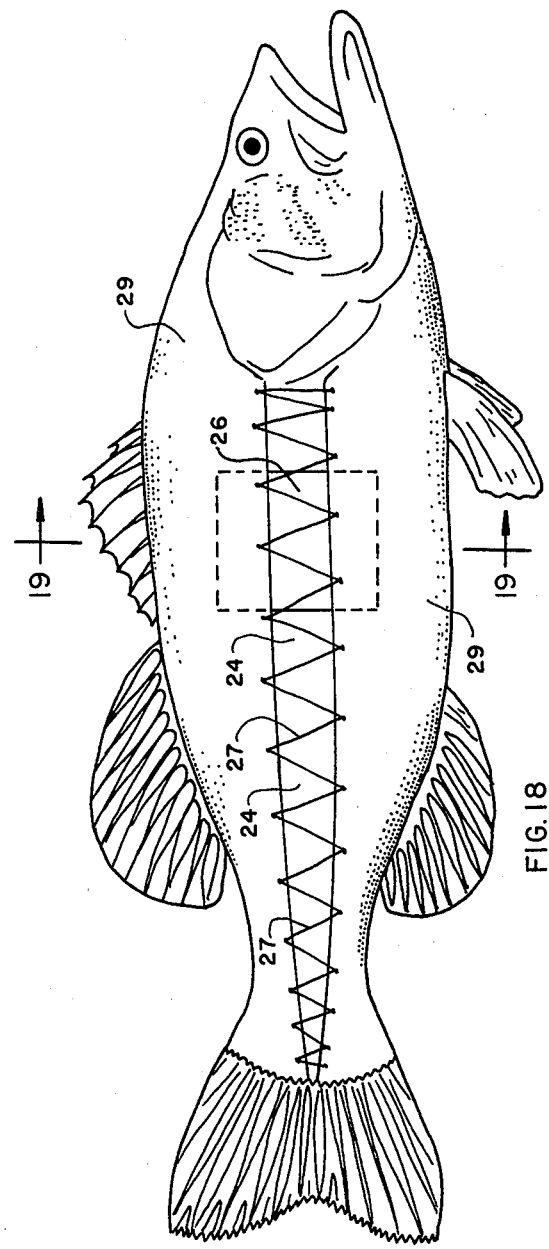
FIG. 18 is a view illustrating a fish skin mounted over the insert body in accordance with my invention.
Figure 19:
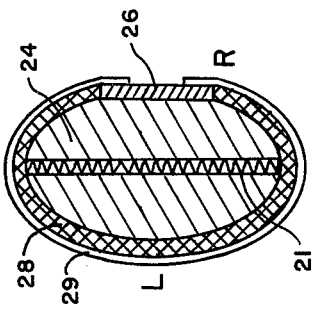
FIG. 19 is a sectional view taken on lines 19—19 of FIG. 18.

FIGS. 18 and 19 show the fish skin 29 properly filled with the lightweight fish body insert piece centrally therein, surrounded by an annular layer of putty 28 substantially three-eighths inch thick, with the skin 29 sewn together on the right side R thereof (the backside) with thread 27. A small rectangular plate 26 of plywood substantially three-eighths inch thick is provided therein on the backside as shown for convenience in mounting the specimen to a wall plaque or the like. The putty material is installed by spreading it over the entire inside of the fish skin to a depth of three-eighths inch, before placing the body insert piece in the cavity. Then the fish body insert piece is placed in the fish skin cavity with the head end H fitting up to the fish head and the tail end T fitting up to the fish tail. The fish skin 29 is then drawn over and pressed against the body insert piece. The putty transfers from the fish skin to the body insert piece. The fish skin on the back side may then be peeled back away from the putty, and an amount of putty removed to make room for installing the plywood mounting plate 26. Also, putty may be packed up into the fish head area as needed. Then the fish skin is drawn over and sewn together with thread 27 as shown in FIG. 18.

Accordingly, it will be seen that my invention provides a novel and useful lightweight fish body insert piece and a method of making the same which is advantageous in not requiring special skill or great time and yet permits control of the insert piece to a predetermined and measured size and shape, and permits bending of the insert piece to a desired curvature along its long axis with its head and tail ends out front from its midportion.

Having thus fully described the preferred embodiment of my invention for illustrative purposes, it will be understood that various modifications in the invention may be made without departing from the spirit and scope of the novel concepts thereof, or from the scope of the claims hereinafter made.

I claim as my invention:

1. A method of making a taxidermy lightweight fish body insert piece slightly smaller in girth than the fish body itself for insertion centrally into the fish skin cavity with putty filling annularly about the insert piece so that the insert piece and the putty thereabout together substantially duplicate the size and shape of the fish body itself to correctly fill the fish skin cavity, the method comprising:

laying the fish on paper and tracing on the paper an upper and lower outline of the fish, exclusive of the head, tail and fins;

placing on the fish, a straight narrow strip of paper substantially normal to the long axis of the fish and extending substantially from the top center line of the fish to the bottom center line of the fish, at each of the six positions of: forward body end at cheek; rear body end at forward limit of tail; gill girdle; largest girth; anal contour; and tail contour at rear of dorsal fins;

marking, on the top and bottom of the traced outline, an end mark at each of said six positions;

removing the fish from the paper, completing the upper and lower body outline of the fish from said traced outline, and marking straight lines on the paper connecting the respective end marks at each of said six positions;

measuring in and marking on each of said lines representing said six positions, from the top and the bottom of the fish outline, a uniform distance of about three-eighths inch, and joining these markings to provide a reduced fish outline comprising upper and lower lines parallel to and within the fish outline;

joining the rearward ends of the upper and lower reduced fish outline lines with a curved line convexly extending slightly rearwardly, and joining the forward ends of the upper and lower contour reduced fish outline lines with a curved line extending slightly forwardly and having a concavity therein centrally extending slightly rearwardly, to thereby form a pattern outline for a centerboard for the body insert piece;

cutting, from corrugated fluted cardboard, a centerboard for the body insert piece, according to said reduced fish outline, with the fluting lines of the cardboard being substantially normal to the long axis of said reduced fish outline;

laying the fish again on the paper in its original location, and forming thereon of soldering wire, by bending to fit and cutting to length, an arcuate half-girth contour piece for each of said six positions, each piece extending from the top center line to the bottom center line of the fish;

making a contour gauge card from a piece of thin stiff paper chipboard card by tracing half-girth lines thereon along the inside of each of said four arcuate half-girth contour pieces with their ends at an edge of said card, by successively laying said card on the paper with the pertinent one of said traced half-girth lines matching the fish outline at the pertinent one of the central four of said six positions, and drawing on said card a reduced arcuate contour line parallel to and spaced about three-eighths inch from the pattern contour outline starting from and ending with said reduced fish outline, and by cutting said card along said reduced arcuate contour lines to provide arcuate concavities in said card for use in gauging various half girths of the body insert piece;

forming said body insert piece by forming a first half of said body insert piece by building up on a first side of said centerboard a mass of excelsior wrapped thereon with string, using said contour gauge to control the size and shape of said first half of said body insert piece, and by forming a second half thereof on the second side of said centerboard in the same manner, to thereby complete said body insert piece of desired size and shape.

2. A method of making a taxidermy lightweight fish body insert piece slightly smaller in girth than the fish body itself for insertion centrally into the fish skin cavity with putty filling annularly about the insert piece so that the insert piece and the putty thereabout together substantially duplicate the size and shape of the fish body itself to correctly fill the fish skin cavity, the method comprising:

tracing an outline of the fish, exclusive of the head, tail and fins;

marking, on the top and bottom of the traced outline, an end mark at each of the six positions of: forward body end at cheek; rear body end at forward limit of tail; gill girdle; largest girth; anal contour; and tail contour at rear of dorsal fins;

completing a body outline of the fish from said traced outline;

measuring in from each of said end marks and marking an inner mark a uniform distance therefrom, and joining these inner marks to provide a reduced fish outline;

forming on the fish of bendable wire an arcuate half-girth contour piece, for each of a plurality of said six positions, by bending to fit and cutting to length;

making a contour gauge card from a sheet by tracing half-girth lines thereon from each of said arcuate half-girth contour pieces with their ends at an edge of said sheet, drawing on said sheet a reduced arcuate contour line parallel to and spaced therefrom said same uniform distance, and by cutting said sheet along said reduced arcuate contour lines to provide arcuate concavities in said edge of said gauge card for use in gauging the half girths of the body insert piece;

cutting, from corrugated fluted cardboard, a centerboard for the body insert piece, according to said reduced fish outline, with the fluting lines of the cardboard being substantially normally to the long axis thereof;

forming said body insert piece by forming a first half of said body insert piece by building up on a first side of said centerboard a mass of excelsior wrapped thereon with string, using said contour gauge card to control the size and shape of said first half of said body insert piece, and by forming a second half thereof on the second side of said centerboard in the same manner, to thereby complete said body insert piece of desired size and shape.

3. A taxidermy lightweight fish body insert piece slightly less in girth than the fish body itself, comprising:

a centerboard piece of substantially the same length as the fish body itself but slightly reduced marginally in width outline from the fish body itself by a predetermined measured amount, the centerboard piece being of fluted corrguated cardboard with the fluting lines substantially normal to the long axis thereof; and first and second half-body masses of semi-elliptical cross section built up, respectively, on the first and second sides of said centerboard piece, of excelsior string-wrapped thereto, to a half-girth size reduced marginally from that of the fish body itself by said same predetermined measured amount.

4. The invention set forth in claim 3 wherein said measured amount is approximately three-eighths inch.

* * * * *